T. W. COOPER.
LENS.
APPLICATION FILED SEPT. 24, 1921.

1,425,452.

Patented Aug. 8, 1922.

Thomas W. Cooper,
INVENTOR.

BY Victor J. Evans
ATTORNEY

WITNESS:

UNITED STATES PATENT OFFICE.

THOMAS W. COOPER, OF MONTCLAIR, NEW JERSEY.

LENS.

1,425,452.  Specification of Letters Patent.  Patented Aug. 8, 1922.

Application filed September 24, 1921. Serial No. 502,857.

*To all whom it may concern:*

Be it known that I, THOMAS W. COOPER, a citizen of the United States, residing at Montclair, in the county of Essex and State of New Jersey, have invented new and useful Improvements in Lenses, of which the following is a specification.

This invention relates to the class of optics and more particularly to lenses for use in eye glasses or spectacles of the bifocal type and it has for its object the provision of means for neutralizing spherical aberration at the joinder of the lens fields.

Another object of the invention is to provide a lens constructed from a single piece of glass and provided with a plurality of surfaces of relatively different dioptrics, providing a plurality of fields capable of use for such purposes as the particular lens is designed, i. e., the fields of the lens may be respectively for distance and reading purposes.

A further object of the invention is to provide a lens in which the different fields thereon will not be prominently shown by a line of demarkation between the fields.

A further object of the invention is to provide a converging concavo convex lens having surfaces or curvatures of unequal radii so as to provide the lens with a perfectly smooth surface at the division between said fields, thereby rendering the lens free at such points from prismatic effects or aberration. In my improvement which will be more particularly described hereinafter, the lens for all intents and purposes is uniformly concavo convex but it is bounded in vertical section as shown herein by curvatures of relatively different radii, two of which are less than a third one of said surfaces.

In this manner I change the power of the fields of the lens and I am able, in my grinding process to give to the lens that smooth or unbroken surface which has not heretofore been possible in the manufacture of so called one piece bifocal lenses.

In the drawings:—

In providing a lens which is free from spherical and chromatic aberration, and one which is geometrically designed to afford a medium for the sight in properly assisting vision in the view of objects, and one which is formed from a single piece of glass in a manner to present a smooth or unbroken surface between the fields, I preferably employ a converging concavo convex lens 5, having curves of relatively different radii, the same indicated generally by A, B and C.

Figure 1:
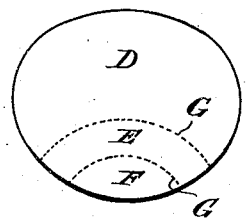
Figure 1, is a front elevation of the lens showing the intermediate field in dotted lines.
Figure 4:
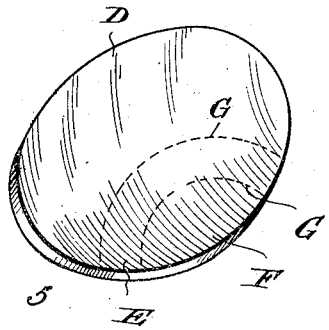
Figure 4, is a perspective view looking toward the concaved side of the lens.
Figure 3:
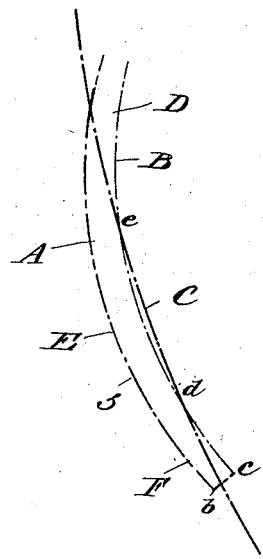
Figure 3, is a diagrammatic illustration showing the manner of dividing the lens, by the two principal inside arcs.
Figure 2:
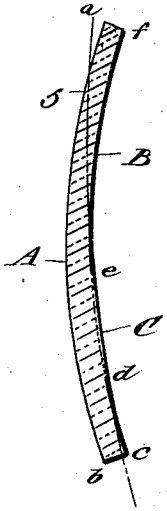
Figure 2, is a vertical exaggerated section through the lens.

In the present illustration, the radius of the curve A, is less than the radius of the curve B, and the radius of the curve C, greater than either of the aforesaid curves A and B. All of these curves have their centers remotely to one side of the concave of the lens. The arc of the curve C intersects the arc of the curve B. In this manner, the lens is divided into fields, D, E and F, in which the dioptrics of the fields D and F are the same and the dioptric of the field E different. In the front elevation of the lens shown in Figure 1, it will be observed that the field E, in addition to being partly bounded by the arc C, is further bounded by imaginary concentric arcs G—G which terminate respectively at the opposite side edges of the lens.

At the juncture of the arcs G—G, with the fields D and F, the lens is ground so that all of said fields merge together and the divisions between the fields are relatively smooth and unbroken, rendering the lens free from chromatic and prismatic effects. The lens is entirely concave at one side and entirely convex at its opposite side. However I do not wish to limit myself in this respect as it will be understood that except for the two principal arcs B and C, deviations can be made in the lens which will fall within the scope of the appended claims.

Through the fact that the fields D and F are in exact agreement with each other, I have provided a lens which is found of great benefit to its user. I provide upper and lower distance fields and have separated the same by an intermediate smaller near field which extends clear across the lower section of the lens or from one side thereof to the other side of same.

The arc A, extends between the points *a—b*, the arc B between points *c—d* and *e—f*, the arc C intersecting the arc B in the lines G—G which form the joinder between the respective fields, D, E and F. In this manner I provide a lens having a smooth inside surface, said lines G—G, while not being uniformly of the same thickness between the respective fields, are so merged therein and the surfaces of the fields ground, as to render the lens free from chromatic or prismatic effects.

What is claimed as new is:—

1. A bifocal lens formed of one piece of glass having upper and lower distance fields and a reading or near field interposed between said distance fields, said reading or near field extending clear across the lens at a point below the medial line thereof.

2. A bifocal lens having upper and lower distance fields, and a near field interposed between the distance fields and extending from one side of the lens to the other side thereof at a point below the medial center of the lens, the said interposed near field being defined by an arc of a curve whose radius is greater than the arc of the curve describing the concavity or inner surface of the lens so that the arc of the curve of said concavity and the arc of the curve of said near field intersect each other at the joinder of said near field with said upper and lower fields.

In testimony whereof I have affixed my signature.

THOMAS W. COOPER.